United States Patent [19]

Beecken

[11] 4,123,452
[45] Oct. 31, 1978

[54] STYRYL DYESTUFFS

[75] Inventor: Hermann Beecken, Bergisch-Gladbach, Germany

[73] Assignee: Bayer Aktiengesellschaft, Leverkusen, Germany

[21] Appl. No.: 776,658

[22] Filed: Mar. 11, 1977

[30] Foreign Application Priority Data

Mar. 13, 1976 [DE] Fed. Rep. of Germany ....... 2610674

[51] Int. Cl.$^2$ ...................... C07C 121/78; C09B 23/14
[52] U.S. Cl. ......................... 260/465 E; 8/4; 8/6; 8/54.2; 8/179; 8/180
[58] Field of Search ........................ 260/465 D, 465 E

[56] References Cited

U.S. PATENT DOCUMENTS 3,829,461  8/1974  Raue et al. ..................... 260/465 D
3,920,720  11/1975  Beecken .......................... 260/465 E

FOREIGN PATENT DOCUMENTS 1,110,714  4/1968  United Kingdom.

Primary Examiner—Dolph H. Torrence
Attorney, Agent, or Firm—Plumley and Tyner

[57] ABSTRACT

The invention is directed to dyestuffs of the formula

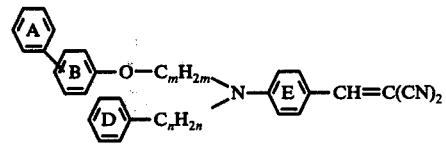

wherein
the phenyl nuclei A, B, D and E can each be substituted
$m$ is 2 or 3 and
$n$ is 1–3.

The dyestuffs are outstanding for dyeing polyesterfibres in yellow shades. They are distinguished by their high stability in boiling dyebaths at pH 7 to 10.

8 Claims, No Drawings

STYRYL DYESTUFFS

The invention relates to new styryl dyestuffs of the formula

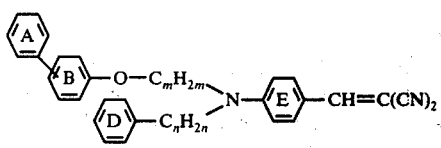

(1)

wherein
the phenyl nuclei A, B, D and E can each be substituted by 1 or 2 radicals from the series methyl, ethyl, trifluoromethyl, methoxy, ethoxy or halogen, preferably chlorine,
$m$ denotes the numbers 2 or 3 and
$n$ denotes the numbers 1–3, and to their preparation and use for dyeing and printing synthetic fibre materials and shaped articles.
Preferred dyestuffs correspond to the formula

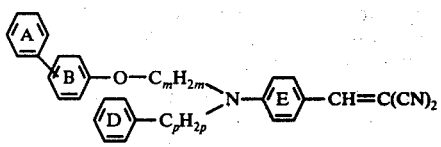

(2)

wherein
the phenyl nuclei A, B, D and E can be substituted as above,
$m$ has the indicated meaning and
$p$ represents the numbers 2 or 3.
Particularly preferred dyestuffs have the formula

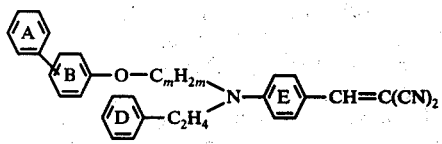

(3)

wherein
the symbols A, B, D, E and $m$ have the indicated meanings.
Outstanding dyestuffs within the scope of the present invention correspond to the formula

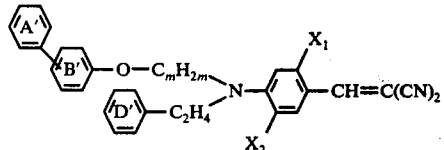

(4)

wherein
$m$ has the indicated meaning and the phenyl nuclei A', B' and D' can be substituted by 1 Cl, $CH_3O$ or $CH_3$,
$X_1$ represents H, $CH_3$, $C_2H_5$, $CF_3$, $OCH_3$, $OC_2H_5$ or Cl and
$X_2$ represents H or $OCH_3$.
Particularly valuable dyestuffs of the invention fall under the formula

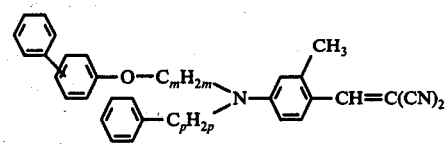

(5)

wherein
$m$ has the indicated meaning,
$X_3$ denotes hydrogen or methyl and
$X_4$ and $X_5$ denote hydrogen, methyl, chlorine or methoxy.
The phenyl substituent on the phenoxy radical is preferably in the 4-position.
The dyestuffs of the formula

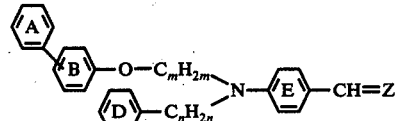

(6)

wherein
the phenyl substituent of the xenyl group is in the 2-, 3- or 4-position relative to the ether oxygen and $m$ and $p$ have the indicated meanings,
are of particular interest industrially.
The new dyestuffs are prepared in a manner which is in itself known by subjecting aldehydes or their functional derivatives of the formula

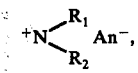

(7)

wherein
the symbols A, B, D, E, $m$ and $n$ have the meanings indicated under formula (1) and
Z represents O, N-R or $$+N\diagup^{R_1}_{R_2} An^-,$$

in which
R denotes a $C_1$-$C_4$-alkyl radical and preferably a phenyl, sulphophenyl or carboxyphenyl radical,
$R_1$ and $R_2$ both represent $C_1$-$C_4$-alkyl and $R_2$ also represents phenyl and
$An^-$ represents any desired acid anion, to a condensation reaction with malodinitrile.
The reactions are carried out at temperatures between 20° and 160° C and preferably in the temperature range of 50°–120° C, in the melt or usually in a solvent which is inert under the reaction conditions. Suitable solvents which may be mentioned are, for example, lower aliphatic alcohols with 1 to 4 carbon atoms, especially methanol, ethanol and the propanols and butanols, and also benzene, toluene, xylene, chlorobenzene, dichlorobenzenes, chloroform, dimethylformamide, dimethylsulphoxide and acetonitrile. The basic catalysts customary for the Knoevenagel reaction, such as, for example, ammonia, diethylamine, triethylamine, piperidine, morpholine, N-ethylpiperidine, N-methylmorpholine, basic ion exchange resins, alkali metal hydroxides, alkali metal alcoholates, alkali metal carbonates, alkali metal acetates and acetates of ammonia and organic bases, such as, for example, ammonium acetate or piperidine acetate, can be added in order to accelerate the reaction. However, the reaction can also readily be carried out in the presence of acetic acid and even in glacial acetic acid as the solvent.

It is also possible, with advantage, to dispense with the customary isolation of the aldehydes (7), which is usually accompanied by heavy losses and, after decomposing excess Vilsmeier reagent by means of lower aliphatic alcohols and adjusting the pH value to about 4 and preferably 6.5–8.5, to use these aldehydes direct for the condensation reaction with malodinitrile. In this case, the presence of an emulsifying additive, for example of oxethylation products of higher alcohols or substituted phenols, can be useful, especially when aqueous alkali or aqueous ammonia is used to adjust the pH.

The starting materials used in order to prepare suitable aldehydes or aldehyde derivatives (7) are, for example, bases of the formula

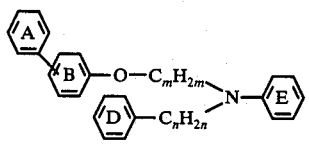

wherein
the symbols A, B, D, E, m and n have the abovementioned meanings,
and these are reacted in a manner which is in itself known with so-called Vilsmeier reagents, that is to say reaction products of N-formyl compounds of the formula $$OHC-N\begin{matrix}R_1\\R_2\end{matrix}$$

with inorganic acid halides, preferably phosphorus oxychloride, thionyl chloride or phosgene. Amongst further suitable processes of preparation for the compounds (7), the formylation according to Duff (Journal of the Chemical Society [London] 1952, pages 1,159–1,164), advantageously in the variant of German Patent Specification 1,206,879, and the process according to Example 17 of U.S. Pat. No. 2,583,551, which lead to the aldimines, may be mentioned in particular.

Several processes which are in themselves known can be used for the preparation of the bases (8), examples being the processes indicated for analogous bases in German Offenlegungsschrift (German Published Specification) 2,316,766; amongst these processes, however, the reaction of phenolates (9) with N-halogenoalkyl-anilines (10) according to the equation

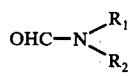

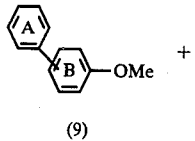

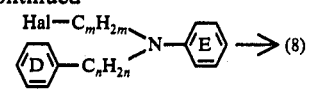

(10)

in which
Me represents 1 equivalent of an alkali metal cation, an alkaline earth metal cation or a heavy metal cation, for example of a Li, Na, K, Mg, Ca, Pb, Cu or Ag cation, and
Hal, in addition to Br, preferably denotes Cl, is preferred. The reaction is carried out, for example, by melting or in solvents, such as methanol, ethanol, butanol, glycol monomethyl ether, toluene, chlorobenzene, dioxane, dimethylformamide or sulpholane, at 50° C to 180° C (preferably at 60° to 140° C).

Examples of suitable phenols (9) (Me = H) which may be mentioned are: 4-hydroxydiphenyl, 3-chloro-4-hydroxydiphenyl, 3-ethyl-4-hydroxydiphenyl, 4'-chloro-4-hydroxydiphenyl, 4'-methoxy-4-hydroxydiphenyl, 4'-ethoxy-4-hydroxydiphenyl, 3,5-dichloro-4-hydroxydiphenyl, 3-hydroxydiphenyl, 6-ethyl-3-hydroxydiphenyl, 2-hydroxydiphenyl, 3-chloro-2-hydroxydiphenyl and 5-ethyl-2-hydroxydiphenyl.

Examples of suitable N-halogenoalkyl-anilines (10) for the preparation of the bases (8) are: N-β-chloroethyl-N-benzyl-m-toluidine, N-β-chloroethyl-N-β'-phenylethyl-m-toluidine, N-β-chloroethyl-N-γ'-phenylpropyl-m-toluidine, N-β-chloroethyl-N-β'-phenylpropyl-m-toluidine, N-β-chloroethyl-N-α'-phenylethyl-m-toluidine, N-β-chloroethyl-N-β'-phenethyl-2,5-dimethoxyaniline, N-β-chloroethyl-N-β'-phenethyl-m-chloroaniline, N-β-chloroethyl-N-β'-phenethyl-m-anisidine, N-β-chloroethyl-N-β'-phenethyl-m-ethylaniline, N-γ-bromopropyl-N-phenethyl-m-toluidine, N-β-chloropropyl-N-β'-phenethyl-m-toluidine, N-β-chloroethyl-N-β'-(p-tolyl)-ethyl-m-toluidine and N-β-chloroethyl-N-β'-phenylethyl-m-trifluoromethylaniline.

The aldehydes (7), which are employed for the preparation of the dyestuffs according to the invention, are accessible in high yields by formylation of the bases (8), a great variety of which are obtained from the phenols (9) and N-halogenoalkylanilines (10) by a reaction which is in itself known.

The same aldehydes are obtained by the following reactions

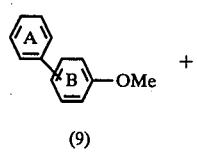

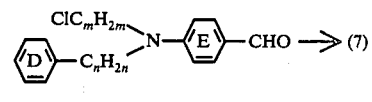

in a manner which is in itself known (compare German Offenlegungsschrift (German Published Specification) 2,316,766) and the N-chloroalkyl-N-phenalkyl-aminobenzaldehydes (11), which serve as the starting compounds, are obtained by a route which is known in principle, from the corresponding N-hydroxyalkyl-N-phenalkyl-anilines in one step by the Vilsmeier reaction.

The dyestuffs according to the invention are outstandingly suitable for dyeing and printing hydrophobic fibre materials, especially polyesters, for example those obtained from terephthalic acid and ethylene glycol or 1,4-bis-(hydroxymethyl)-cyclohexane, polycarbonates, for example those obtained from α,α-dimethyl-4,4'-dihydroxy-diphenylmethane and phosgene, cellulose esters, for example cellulose triacetate, and fibres based on polyvinyl chloride, and possess a good to very good affinity.

The dyestuffs are employed in accordance with known dyeing processes, for example in the exhaustion process as aqueous dispersions in the presence of customary dispersing agents, and optionally customary carriers at temperatures of close to 100° C, or without carriers at 120°–140° C (high temperature process). They are also outstandingly suitable for dyeing by the known thermosol process. Wool and cotton which are present in the dyebath at the same time are not dyed, or are only slightly dyed, by the dyestuffs, so that the latter can readily be used for dyeing polyester/wool and polyester/cellulose fibre mixed fabrics. The dyestuffs possess an excellent solubility in many organic solvents and can be used for dyeing lacquers, oils and plastics, such as polystyrene and polyethylene, in bulk and for dyeing fibres by the customary spin-dyeing processes.

The dyestuffs according to the invention impart clear, yellow dyeings of very good fastness to light, washing and sublimation to the hydrophobic materials mentioned. It is possible to combine the dyestuffs with blue azo and anthraquinone disperse dyestuffs and to dye with these combinations, and green dyeings, which have very good fastness to light and do not display any "catalytic fading," are then obtained on cellulose triacetate and on polyester.

The very high stability of the dyestuffs according to the invention in the dyebath and to prolonged boiling, in neutral to moderately basic liquors and printing pastes (pH stability up to about pH 10), is also to be singled out in particular and the dyestuffs are therefore also very suitable, in combination with reactive dyestuffs which require the presence of alkali (sodium carbonate or sodium bicarbonate) for single bath dyeing (thermosol/thermofixing process) and printing on polyester/cotton mixed fabrics.

In the examples which follow parts denote parts by weight, unless expressly stated otherwise; the relationship between parts by weight and parts by volume (parts by vol.) is the same as that between grams and milliliters. The temperature data are to be understood as degrees Centigrade. Without exception, the structures of the dyestuffs prepared were confirmed by mass spectrometry; the molecular weights determined correspond to those calculated.

EXAMPLE 1

10 parts of N-β-phenylethyl-N-β'-(p-xenyloxy)-ethyl-2-methyl-4-aminobenzaldehyde (melting point 117°–119° C) and 3 parts of malodinitrile in 200 parts by vol. of ethanol, with the addition of a few drops of piperidine, are heated to the reflux temperature for 4.5 hours. After the reaction mixture has cooled, the dyestuff which has separated out is isolated in a virtually pure form by filtering off, washing with ethanol and drying at 50° C in vacuo.

Yield: about 10 parts of a yellow crystalline powder with a melting point of 120°–122° C.

The product corresponds to the formula

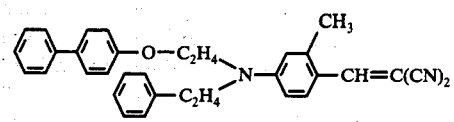

as is confirmed by elementary analysis and mass spectrometry [molecular weight; calculated 483.6; found m/e = 483 (6%); 392 (100%)] and dyes polyester fibres and cellulose triacetate rayon from an aqueous dispersion in clear, greenish-tinged yellow shades which have outstanding fastness to light and sublimation. The dyestuff is distinguished by a high pH stability in the dyebath and displays outstanding affinity. It can be further purified by recrystallisation from butanol or cyclohexane and then melts at 124°–125° C. However, this is not important for its coloristic use.

(a) The aldehyde used to synthesise the dyestuff is prepared in the following way: 9.35 parts of 4-hydroxydiphenyl and 13.7 parts of N-β-phenylethyl-N-β'-chloroethyl-m-toluidine are added to a solution of 1.3 parts of sodium in 50 parts by vol. of ethanol and the mixture is heated to the reflux temperature for about 10–12 hours. After this time no more than traces of the β-chloroethyl compound can be detected by thin layer chromatography. The solvent is now removed as completely as possible by distillation - finally under reduced pressure - and an oily residue which essentially consists of N-β-phenylethyl-N-β'-(p-xenyloxy)-ethyl-m-toluidine is obtained and is further reacted without purification. For this purpose, the oil is taken up in 11 parts of dimethylformamide and 10 parts of phosphorus oxychloride are added dropwise, whilst stirring, at such a rate that the temperature of the mixture does not rise substantially above 60° C (external cooling). In order to bring the Vilsmeier formylation to completion, the mixture is stirred for a further 10–15 hours (monitored by thin layer chromatography) at 50°–60° C, 20 parts by vol. of ethanol are then added dropwise, whilst cooling, in order to decompose excess Vilsmeier reagent and about 30 parts by vol. of half-concentrated sodium hydroxide solution are then allowed to run in until the mixture displays a strongly alkaline reaction. The aldehyde, which is obtained as crystals, is filtered off, washed with water until neutral and dried at 50° C in vacuo.

Yield: 21 parts of a crude product with a melting point of 110°–114° C which can be employed for the synthesis of the dyestuff without special purification. Pure aldehyde with a melting point of 117°–119° C is obtained from the crude product by recrystallisation from butanol with the addition of a little bleaching earth.

(b) The same aldehyde is also obtained direct by employing the corresponding N-β-phenylethyl-N-β'-chloroethyl-2-methyl-4-aminobenzaldehyde, which is accessible direct from N-β-phenylethyl-N-β'-hydroxyethyl-m-toluidine by a Vilsmeier reaction, in place of the N-β-phenylethyl-N-β'-chloroethyl-m-toluidine used above. For this purpose the procedure is, for example, as follows: 1.3 parts of sodium are dissolved in 50 parts by vol. of ethanol, 9.35 parts of 4-hydroxy-diphenyl and 14.3 parts of N-β-phenylethyl-N-β'-chloroethyl-2-methyl-4-aminobenzaldehyde (crude, melting point 67°–69° C) ... heated for several hours to the reflux temperature until no more than traces of the β-chloroethyl-aldehyde can be detected by chromatography. After the mixture has cooled, the N-β-phenylethyl-N-β'-(p-xenyloxy)-ethyl-2-methyl-4-aminobenzaldehyde which has separated out is filtered off, washed with ethanol and then with water and dried. In the form in which it is obtained it is sufficiently pure for reaction with malodinitrile to give the styryl dyestuff. Replacement of the β-chlorine atom by the xenyloxy group takes place more rapidly when the reaction is carried out in higher-boiling solvents (chlorobenzene, dimethylformamide or N-methylpyrrolidone) and with dried sodium 4-phenylphenolate or potassium 4-phenylphenolate at 100°–140° C.

(c) Application of the method of Example 87 of German Offenlegungsschrift (German Published Specification) 2,316,766 to the reaction of N-β-phenylethyl-N-β'-chloroethyl-m-toluidine with sodium phenyl-phenolate or potassium phenyl-phenolate and, on the other hand, the preparation of the styryl dyestuffs according to the invention by the process of German Offenlegungsschrift (German Published Specification) 2,308,706 (Example 7) without intermediate isolation of the aldehyde offer advantageous variants for the preparation of the said styryl dyestuff. The styryl dyestuffs prepared in this way possess the expected outstanding coloristic properties.

The table which follows gives further examples of dyestuffs according to the invention, which are obtained analogously to Example 1 and possess comparable coloristic properties, in particular a high pH stability in the dyebath, a good affinity for polyester materials and very good fastness to light, wet processing and sublimation:

| Example No. | Structure | Colour shade on polyester and cellulose triacetate |
|---|---|---|
| 2 | (structure) | strongly greenish-tinged yellow |
| 3 | (structure) | " |
| 4 | about 75% (structure) / about 25% (structure) | " |
| 5 | (structure) | " |
| 6 | (structure) | " |
| 7 | (structure) | " |

-continued

| Example No. | Structure | Colour shade on polyester and cellulose triacetate |
|---|---|---|
| 8 | $C_6H_5-\langle\rangle-O-C_2H_4\diagdown N-\langle\rangle(CH_3)-CH=C(CN)_2$ with $-(CH_2)_3-\langle\rangle$ on N | " |
| 9 | $C_6H_5-\langle\rangle-O-C_2H_4\diagdown N-\langle\rangle(CH_3)-CH=C(CN)_2$ with $CH_3-\langle\rangle-C_2H_4-$ on N | greenish-tinged yellow |
| 10 | $C_6H_5-\langle\rangle-O-C_2H_4\diagdown N-\langle\rangle(CH_3)-CH=C(CN)_2$ with $CH_3-\langle\rangle-C_2H_4-$ on N (meta-phenoxy) | " |
| 11 | $C_6H_5-\langle\rangle-O-CH(CH_3)CH_2\diagdown N-\langle\rangle(CH_3)-CH=C(CN)_2$ with $-C_2H_4-\langle\rangle$ on N | strongly greenish-tinged yellow |
| 12 | $C_6H_5-\langle\rangle-O-CH(CH_3)CH_2\diagdown N-\langle\rangle(CH_3)-CH=C(CN)_2$ with $-C_2H_4-\langle\rangle$ on N (meta-phenoxy) | " |

EXAMPLE 13

5.9 parts of the azomethine of the formula

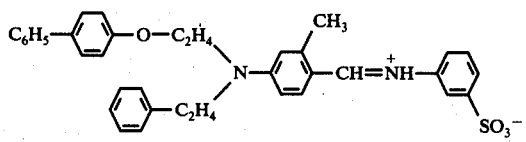

and 1 part of malodinitrile in 50 parts by vol. of ethanol, with the addition of 0.4 part of piperidine, are heated to the reflux temperature for 3 hours. After cooling, the dyestuff which has crystallised out is isolated by filtering off, washing with ethanol and drying (4.5 parts). It melts at 122°–124° C after recrystallisation from butanol and corresponds to the dyestuff according to Example 1 in respect of its structure and coloristic properties.

The same dyestuff is obtained starting from azomethines which are derived from sulphanilic acid, anthranilic acid or aniline, instead of from metanilic acid. The azomethines are prepared, analogously to the instructions of U.S. Pat. No. 2,583,551 (Example 17), from N-β-phenylethyl-N-β'-(p-xenyloxy)-ethyl-m-toluidine by reaction with formaldehyde and subsequent reaction of the product with nitrobenzene or nitrobenzenesulphonic acids in the presence of iron and hydrochloric acid.

EXAMPLE 14

1 part of the dyestuff of the formula

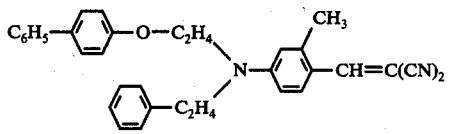

is dissolved in 25 g of dimethylformamide, 1 part of a dispersing agent (an alkylaryl polyglycol ether) is added and a fine dispersion is prepared by stirring in 4,000 parts by vol. of water. 20 g of a carrier (a cresotic acid ester) and 4 g of monosodium dihydrogen phosphate are also added to this dispersion and the pH value of the dyebath is adjusted to 4.5–5 with glacial acetic acid. 100 parts of pre-cleaned polyester material (polyethylene glycol therephthalate of the Dacron type from Messrs. Du Pont) are introduced into this bath at 40°–50° C, the temperature is raised, in the course of 15–20 minutes, to 80°–85° C, where it is kept for 20 minutes, and is then gradually raised to the boiling point. After a period of 1 hour to 1.5 hours at the boil, the dyeing process has ended. The dyed material is rinsed, first hot and then cold, and is dried. It displays a clear, greenish-tinged yellow dyeing with very good fastness to light, washing and sublimation.

The dyestuff can also be used as a made-up powder by grinding it as an aqueous paste with a dispersing agent (for example ligninsulphonate) and then drying the paste.

When the additional use of a carrier is dispensed with, a comparable dyeing is obtained when dyeing is carried out by the high temperature dyeing process (HT process) using a liquor ratio of 1:20. The pre-cleaned polyester material is again introduced at 40°–50° C into the dyebath, which is otherwise prepared in the same way, the bath temperature is raised to 125° C in the course of 30–40 minutes and dyeing is carried out for 1–1.5 hours at this temperature.

EXAMPLE 15

100 parts of a fabric made of cellulose triacetate rayon are dyed for 1 hour at the boil in a dyebath prepared from 1.5 parts of the dyestuff according to Example 2, 4 parts of Marseilles soap and 4,000 parts of water. The resulting greenish-tinged yellow dyeing possesses very good fastness properties.

EXAMPLE 16

1,000 parts of polystyrene are mixed with 6 parts of the dyestuff of the formula

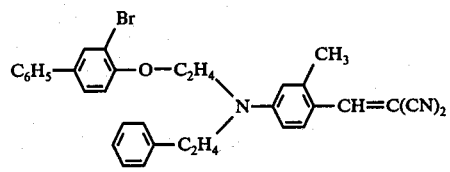

and the mixture is melted in the customary manner at about 200° C under a nitrogen atmosphere. The greenish-tinged yellow injection mouldings obtained from this material display good colour fastness.

Further dyestuffs according to the invention, which dye polystyrene with comparable good colour fastness, are listed in the table which follows:

I claim:
1. Styryl dyestuff of the formula

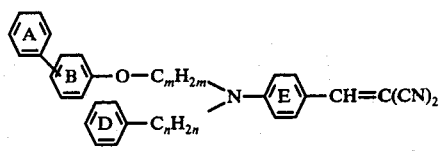

wherein
the phenyl nuclei A, B, D and E can each be substituted by 1 or 2 radicals from the series methyl, ethyl, trifluoromethyl, methoxy, ethoxy and halogen,
$m$ denotes the numbers 2 or 3 and
$n$ denotes the numbers 1–3.

2. Styryl dyestuff according to claim 1, of the formula

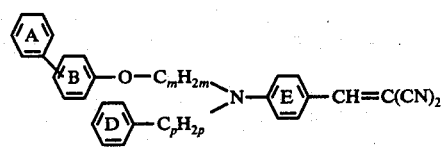

wherein
the phenyl nuclei A, B, D and E can be substituted as indicated in claim 1,
$m$ has the meaning indicated in claim 1 and
$p$ represents the numbers 2 or 3.

| Example No. | Structure | Colour Shade |
|---|---|---|
| 17 | $C_6H_5$—⬡—O—$C_2H_4$—N(—⬡—$CH_2$)—⬡($CH_3$)—CH=C(CN)$_2$ | strongly greenish-tinged yellow |
| 18 | $C_6H_5$—⬡—O—$C_2H_4$—N(—⬡—$C_2H_4$)—⬡(Cl)—CH=C(CN)$_2$ | " |
| 19 | $C_6H_5$—⬡—O—$C_2H_4$—N(—⬡—$C_2H_4$)—⬡—CH=C(CN)$_2$ | " |
| 20 | $C_6H_5$—⬡—O—$C_2H_4$—N(—⬡—$C_2H_4$)—⬡($OCH_3$)—CH=C(CN)$_2$ | " |
| 21 | $C_6H_5$—⬡—O—$C_2H_4$—N(—⬡—$C_2H_4$)—⬡($CF_3$)—CH=C(CN)$_2$ | " |

3. Styryl dyestuff according to claim 1, of the formula

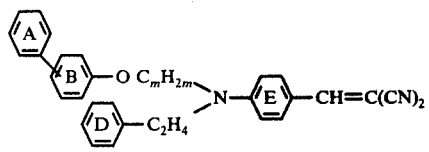

wherein
the symbols A, B, D, E and $m$ have the meanings indicated in claim 1.

4. Styryl dyestuff according to claim 1, of the formula

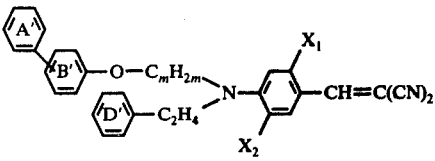

wherein
$m$ has the meaning indicated in claim 1 and the phenyl nuclei A′, B′ and D′ can be substituted by 1 Cl, CH$_3$O or CH$_3$,
X$_1$ represents H, CH$_3$, C$_2$H$_5$, CF$_3$, OCH$_3$, OC$_2$H$_5$ or Cl and
X$_2$ represents H or OCH$_3$.

5. Styryl dyestuff according to claim 1, of the formula

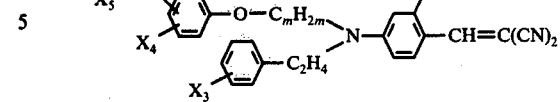

wherein
$m$ has the indicated meaning,
X$_3$ denotes H or CH$_3$ and
X$_4$ and X$_5$ independently of one another denote hydrogen, methyl, methoxy or chlorine.

6. Styryl dyestuffs according to claim 1, of the formula

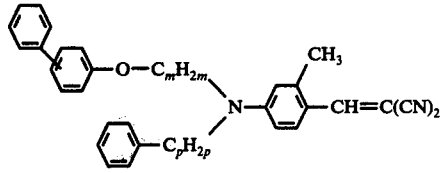

wherein
the phenyl substituent on the phenoxy radical is in the 2-, 3- or 4-position and
$m$ and $p$ have the indicated meanings.

7. Styryl dyestuff according to claim 6, in what the phenyl substituent is in the 4-position.

8. The dyestuff of claim 1 in which halogen is chlorine.

* * * * *